US012609879B2

(12) United States Patent
Bachu et al.

(10) Patent No.: US 12,609,879 B2
(45) Date of Patent: Apr. 21, 2026

(54) IDENTIFICATION OF NETWORK PORTION RESPONSIBLE FOR PACKET LOSS

(71) Applicant: Arista Networks, Inc., Santa Clara, CA (US)

(72) Inventors: Rikith Reddy Bachu, Gundlapochampally (IN); Karan Gupta, Pune (IN)

(73) Assignee: Arista Networks, Inc., Santa Clara, CA (US)

( * ) Notice: Subject to any disclaimer, the term of this patent is extended or adjusted under 35 U.S.C. 154(b) by 546 days.

(21) Appl. No.: 18/078,434

(22) Filed: Dec. 9, 2022

(65) Prior Publication Data

US 2024/0195717 A1 Jun. 13, 2024

(51) Int. Cl.
*H04L 43/0829* (2022.01)
*H04L 43/02* (2022.01)
*H04L 43/18* (2022.01)

(52) U.S. Cl.
CPC .......... *H04L 43/0829* (2013.01); *H04L 43/02* (2013.01); *H04L 43/18* (2013.01)

(58) Field of Classification Search
CPC ...... H04L 43/0829; H04L 43/02; H04L 43/18
See application file for complete search history.

(56) References Cited

U.S. PATENT DOCUMENTS

| | | | |
|---|---|---|---|
| 2007/0115832 A1* | 5/2007 | Ramalho | H04L 43/0829 370/352 |
| 2008/0049775 A1* | 2/2008 | Morrill | H04L 41/5009 370/419 |
| 2016/0036673 A1* | 2/2016 | Meirosu | H04L 43/0852 370/252 |
| 2016/0359710 A1* | 12/2016 | Fan | H04L 43/04 |
| 2017/0054619 A1* | 2/2017 | Kim | H04L 43/028 |
| 2021/0092034 A1 | 3/2021 | Reddy et al. | |

* cited by examiner

*Primary Examiner* — Abdullahi E Salad
(74) *Attorney, Agent, or Firm* — Treyz Law Group, P.C.; Tianyi He

(57) ABSTRACT

A network device such as a wireless access point can store expected sequence number information associated with a network flow. The expected sequence number information may be updated as the network device receives data packets in the network flow. Based on comparisons of the maintained expected sequence number information with sequence numbers of the received data packets, the network device can generate information indicative of packet loss in a first portion of the network. The network device can use maintained acknowledgement number information to generate information indicative of packet loss in the network. Based on the information indicative of packet loss in a first portion of the network and information indicative of packet loss in the network, the network device can identify packet losses in an additional portion of the network.

20 Claims, 9 Drawing Sheets

| (TX) PACKET |
| --- |
| TCP SEQUENCE NUMBER (S) |
| DATA PAYLOAD LENGTH (L) |

MAINTAIN INFORMATION FOR
A NETWORK FLOW                                    130

DETERMINE A TOTAL NUMBER OF PACKETS
IN THE NETWORK FLOW LOST IN A NETWORK            132

DETERMINE A FIRST NUMBER OF PACKETS IN
THE NETWORK FLOW LOST IN A FIRST
NETWORK PORTION OF THE NETWORK                   134

DETERMINE A SECOND NUMBER OF PACKETS
IN THE NETWORK FLOW LOST IN A SECOND
NETWORK PORTION BASED ON THE TOTAL
NUMBER AND THE FIRST NUMBER                       136

IDENTIFICATION OF NETWORK PORTION RESPONSIBLE FOR PACKET LOSS

BACKGROUND

A communication system includes multiple network devices that are interconnected to form a network for conveying packets from source devices to destination devices. Packets can be dropped at various locations across the network. It may be desirable to provide insight on where packet losses or drops are occurring within the network.

DETAILED DESCRIPTION

Network packets can be lost during conveyance through a network between host devices. To analyze network performance and/or to perform appropriate mitigations operations, one or more network devices in the network may be configured to track these packet losses. Packet losses can be tracked on a per-network-flow basis. In particular, a network device may be configured to determine which network portion is responsible for each packet loss in a particular network flow, thereby providing insight into the distribution of packet losses for the network flow across the network. The network device may determine this type of packet loss information for multiple network flows.

The network device may be configured to use a packet loss determination scheme that relies on characteristics common to reliable packet transport protocols such as Transmission Control Protocol (TCP). Configuration in which the network device maintains information for tracking TCP packets (e.g., network packets with TCP headers such as a TCP sequence number and a TCP acknowledgement number) are sometimes described herein as an illustrative example. If desired, network packets having analogous sequence and acknowledgement parameters based on other reliable packet transport protocols may be tracked (instead of or in addition to TCP parameters) to determine network portions responsible for packet losses for each network flow.

Figure 1:
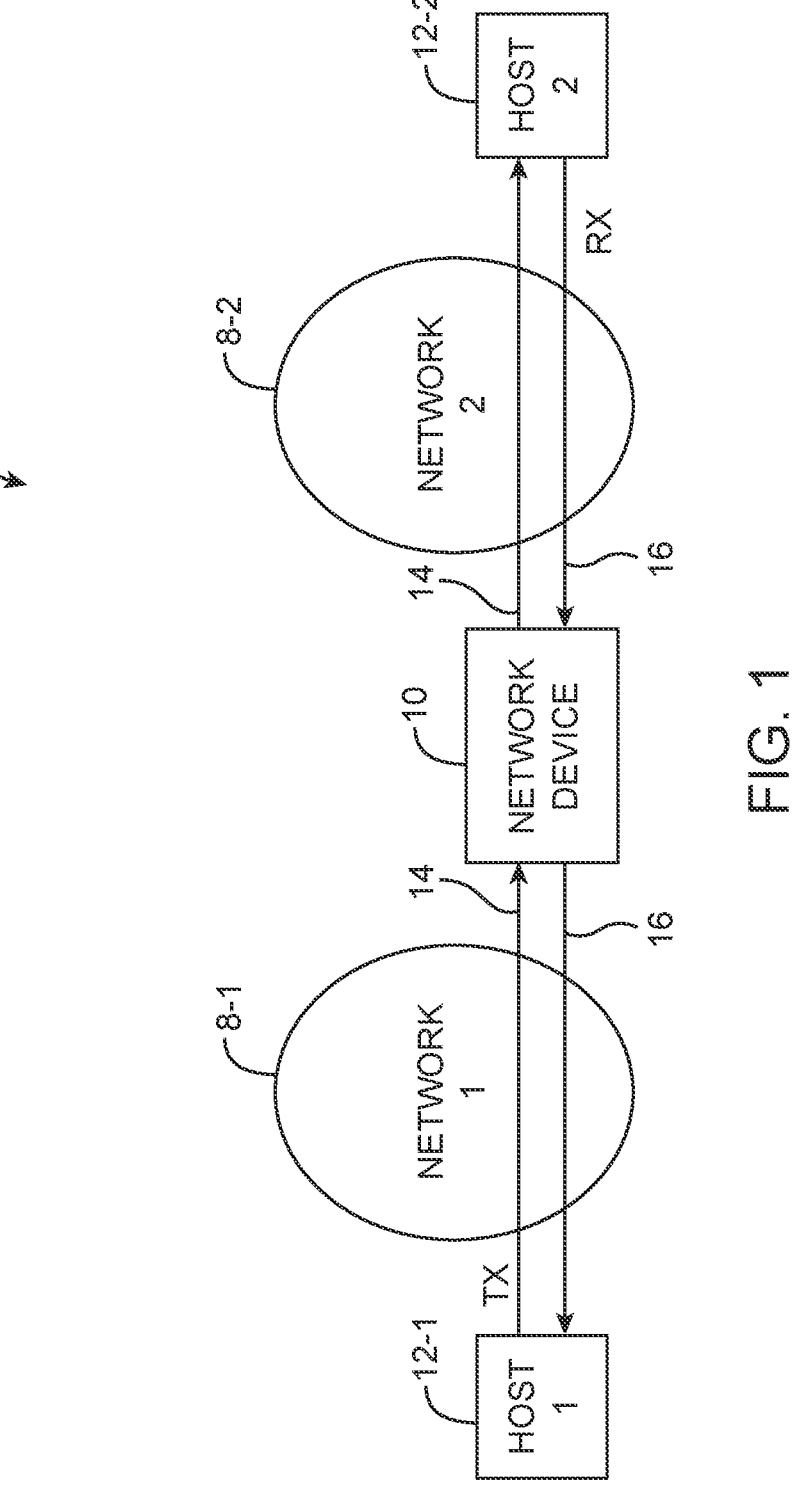
FIG. 1 is a diagram of an illustrative network having multiple network portions in accordance with some embodiments.

FIG. 1 is a diagram of an illustrative communications network such as network 8. Network 8 may be implemented with any suitable scope (e.g., as a campus area network, as a local area network, as a wide area network, etc.). Network 8 may generally be a communications network that extends over a large geographical area for implementing computer networking functions. If desired, network 8 may include one or more wired networks based on wired technologies or standards such as Ethernet (e.g., using copper cables and/or fiber optic cables), wireless networks such as wireless local area network (WLAN) or Wi-Fi networks, internet service provider networks (e.g., the Internet) or other public service provider networks, may include private service provider networks (e.g., multiprotocol label switching (MPLS) networks), and/or may include other types of networks such as telecommunication service provider networks (e.g., an LTE network).

Network 8 may be implemented using a plurality of network devices 10 that convey network traffic (e.g., network packets conveying information for user applications and/or other processes) between different end hosts 12. In general, network 8 can include network equipment forming a variety of network devices 10 that interconnect end hosts 12 of network 8. Network devices 10 may include one or more switches, bridges, routers, hubs, repeaters, firewalls, wireless access points, devices serving other networking functions, devices that include the functionality of two or more of these devices, and management equipment that manage and control the operation of one or more of these devices. End hosts 12 can include computers, servers, network service devices, management equipment that manage and control the operation of one or more of these host devices 12 and/or network devices 10, and any other suitable types of specialized or general-purpose host computing equipment, e.g., each running one or more client-side and/or server-side applications.

In the example of FIG. 1, a first host device 12-1 may be coupled to a second host device 12-2 through one or more network paths in network 8. One or more network devices 10 may be coupled along these network paths. An illustrative network device 10 is shown in FIG. 1. Multiple other network devices 10 may also be coupled along these network paths but are omitted from FIG. 1 in order to not unnecessarily obscure the present embodiments.

Through these network paths in network 8, host device 12-1 can convey network packets containing user/application data as the data payload to host device 12-2. These network packets may collectively form an application data packet flow 14 (e.g., illustrated in FIG. 1 to be in the transmit (TX) direction from the perspective of host device 12-1). Because communication between host devices 12-1 and 12-2 may be based on a reliable packet transport protocol such as TCP, packet flow 14 may be accompanied by an acknowledgement packet flow 16 containing network packets with acknowledgement messages that are conveyed through these network paths in network 8 from host device 12-2 to host device 12-1. Packet flow 16 is illustrated in FIG. 1 to be in the transmit (RX) direction from the perspective of host device 12-1. Acknowledgement messages in packet flow 16 may help host device 12-1 identify whether any of the sent packets in packet flow 14 was not received by host device 12-2 and/or whether re-transmission of any of these packets are desired.

While only a single application data packet flow such as packet flow 14 from host device 12-1 to host device 12-2 is shown in FIG. 1, this is merely illustrative. If desired, an analogous application data packet flow from host device 12-2 to host device 12-1 (with the accompanying acknowledgement packet flow from host device 12-1 to host device 12-2) and/or other application data packet flows between any pair of host devices may also exist within network 8.

As shown in FIG. 1, the network packets in application data packet flow 14 from host device 12-1 may first be conveyed through a first network (portion) 8-1 of network 8 to reach intervening network device 10 before subsequently being conveyed through a second network (portion) 8-2 of network 8 to second host device 12-2. The network packets in acknowledgement packet flow from host device 12-2 may first be conveyed through second network portion 8-2 of network 8 to reach intervening network device 10 before subsequently being conveyed through first network portion 8-1 of network 8 to first host device 12-1.

Configurations in which network device 10 is a wireless access point that serves as an interfacial device between a wireless network portion 8-1 of network 8 and a wired network portion 8-2 of network 8 are sometimes described herein as an example. As other illustrative examples, network device 10 may be a switch, router, or other type of network device 10 that serves an interfacial device between two wired network portions 8-1 and 8-2 of network 8. In any of these examples, network portions 8-1 and 8-2 may sometimes be referred to herein as networks 8-1 and 8-2 rather than being referred to as portions of network 8.

Network packets conveyed between end hosts such as from host 12-1 to host 12-2 can sometimes be lost due to a variety of issues that arise within the network. It may be desirable to identify the network portion that causes the packet loss and/or that causes the majority of packet losses in the network in order to diagnose and/or mitigate any possible network issues (e.g., to focus mitigation on the more problematic network portion).

The packet loss identification scheme described herein utilizes packet information from packets in the application data packet flow (e.g., from host device 12-1 to host device 12-2 in FIG. 1) in combination with packet information from the opposite packet flow of acknowledgement messages or packets (e.g., from host device 12-2 to host device 12-1 in FIG. 1). The packet information used to track packet losses may include certain reliability-based parameters or characteristics such as sequence and acknowledgement numbers that keep track of the flow of packets in one and both directions (e.g., to ensure all application data are received). While processing of packets with TCP sequence numbers and TCP acknowledgement numbers are described herein as an illustrative example, packets with other types of sequence numbers and acknowledgement numbers (e.g., based on non-TCP protocols) may also be processed to perform the operations described herein (e.g., to identify the network portion that causes the packet loss).

Figure 2A:
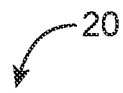
FIGS. 2A and 2B are diagrams of illustrative parameters and characteristics of packets conveyed between hosts in accordance with some embodiments.
Figure 2B:
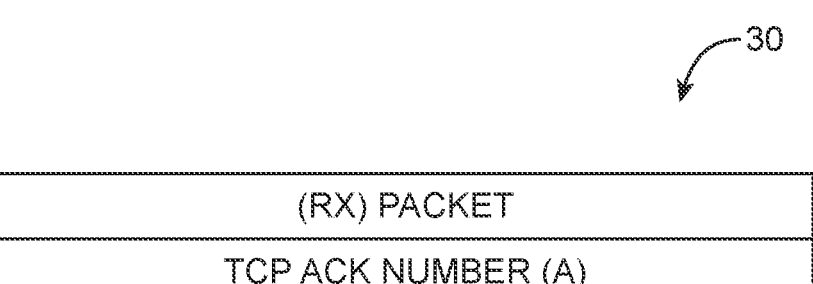

In one illustrative example, these packets may be sent based on TCP such that they include TCP headers. FIGS. 2A and 2B are diagrams of illustrative packet header information that may be used by a network device such as network device 10 in FIG. 1 to monitor the flow of network packets. FIG. 2A shows how an illustrative packet used to convey user/application data may include a TCP sequence number (S) and a data payload length (L). FIG. 2B shows how an illustrative packet used to provide an acknowledgement message may include a TCP ACK (acknowledgement) number (A). Some information such as TCP sequence number (S) and TCP ACK number (A) may be provided as header information in the packet, while other information such as data payload length may, if desired, be extractable based on other information of the packet.

The packet information depicted in FIGS. 2A and 2B is merely illustrative. In general, packets 20 and 30 may each contain other information such as other TCP header information (e.g., packet 20 may also include a TCP ACK number, packet 30 may also include TCP sequence number, a data payload length, etc.), IP header information, Ethernet header information, etc., or even other types of parameters used to provide reliability. If desired, any of these other types of information may be used by a network device instead of or in addition to the information shown in FIGS. 2A and 2B to track application data packet flows and/or acknowledgement packet flows.

Figure 3:
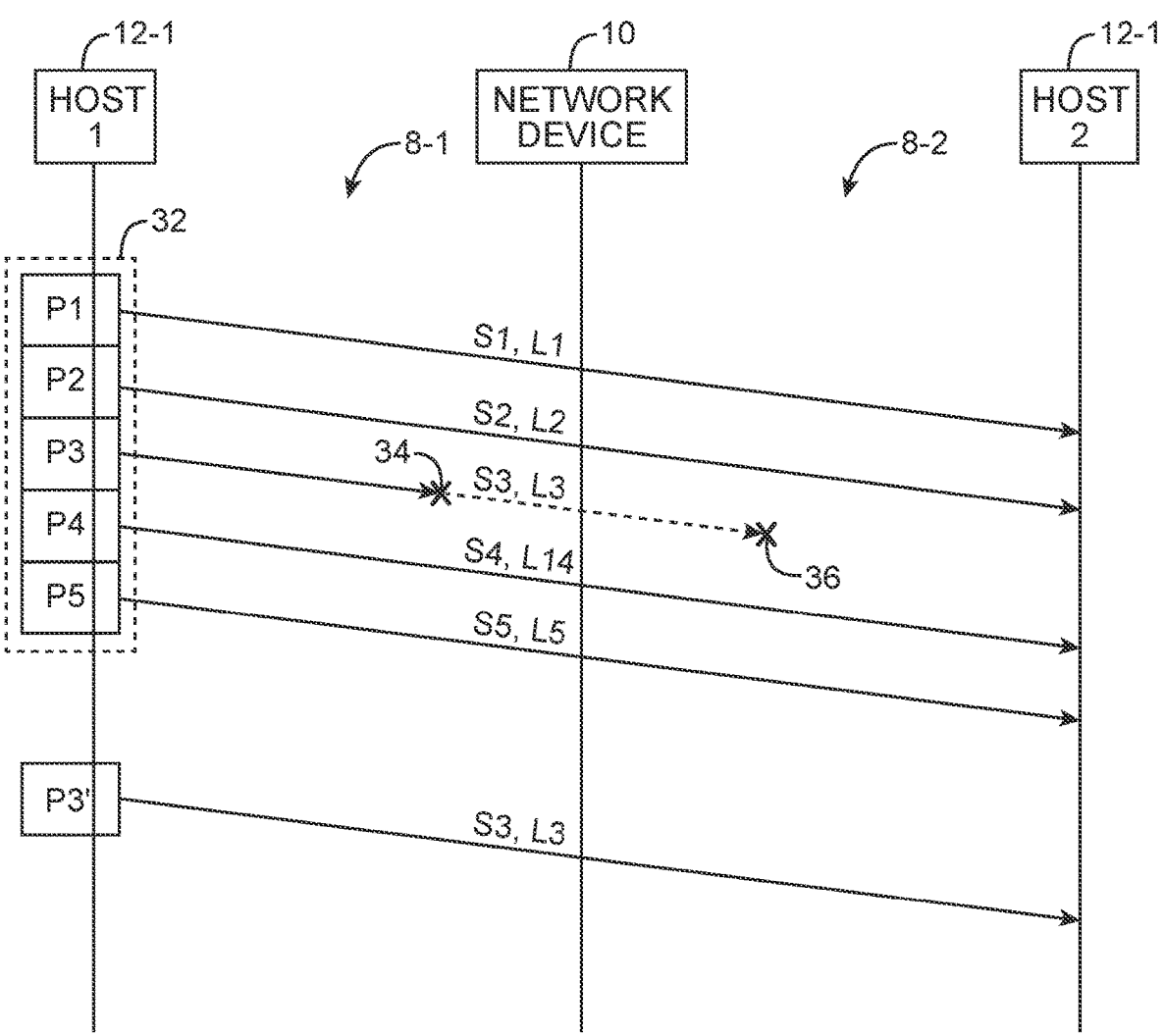
FIG. 3 is a diagram of illustrative data packets being conveyed as part of a packet flow in accordance with some embodiments.

FIG. 3 is a diagram showing illustrative packets that may be conveyed as part of an application data packet flow such as packet flow 14 in FIG. 1. Based on TCP, host device 12-1 may convey application data packets P1, P2, P3, P4, and P5 within a TCP (send) window 32 to host device 12-2. Packets P1-P5 may each be an instance of packet 20 in FIG. 2A and therefore include a TCP sequence number (S) and a data payload length (L).

In the example of FIG. 3, packet P1 includes a sequence number of S1 and has a data payload length of L1. Packet P2 includes a sequence number of S2 and has a data payload length of L2. Packet P3 includes a sequence number of S3 and has a data payload length of L3. Packet P4 includes a sequence number of S4 and has a data payload length of L4. Packet P5 includes a sequence number of S5 and has a data payload length of L5.

In an ideal scenario for application data packets conveyed in a TCP connection, the TCP sequence number of each packet sent during window 32 may be based on the TCP sequence number and the data payload length of the preceding packet. As just a few examples, TCP sequence number S2 of packet P2 may be the sum of TCP sequence number S1 and data payload length L1 of packet P1, TCP sequence number S3 of packet P3 may be the sum of TCP sequence number S2 and data payload length L2 of packet P2, and so on. TCP sequence number S1 of packet P1 without a preceding packet may be set at an initial TCP sequence number. Configured in this manner, hosts 12-1 and 12-2 may track the amount of data sent through the TCP connection using the TCP sequence number.

However, in some instances, one or more packets sent in the TCP (send) window may be lost in the network (e.g., in network portion 8-1 or network portion 8-2). As shown in the example of FIG. 3, while host device 12-1 sent packet P3, host device 12-2 may not have received packet P3. In particular, packet P3 may have been lost in network portion 8-1 or network portion 8-2 (e.g., dropped at a network device in network portion 8-1 or network portion 8-2). While this lost packet P3 may be re-transmitted as packet P3' after transmission of all packets in window 32, thereby ultimately providing host device 12-2 with the application data in packet P3', it may be desirable to identify whether packet P3 is lost in network portion 8-1 (e.g., at location 34) or lost in network portion 8-2 (e.g., at location 36).

To identify whether a packet is lost at network portion 8-1, network device 10 may examine the sequence numbers of packets associated with application data packet flow 14 (FIG. 1) such as packets P1-P5.

In the example of FIG. 3, if packet P3 were lost at location 34 within network portion 8-1, network device 10 may not receive or observe packet P3. Accordingly, by tracking the series of sequence numbers in packets P1-P5, network device 10 may determine that a packet having a sequence number of S3 should have (is expected to have) been received between packets P2 and P4 but was skipped over. Based on this initial determination, device 10 may further determine that packet P3 was lost in network portion 8-1.

However, if packet P3 were lost at location 36 within network portion 8-2, from the perspective of network device 10 and solely based on the examination of sequence numbers in packets P1-P5, network device 10 may be unable to determine whether packet P3 was received by host device 12-2 or lost within network portion 8-2 before being received by host device 12-2. In other words, in both of these scenarios, network device 10 may receive packets having appropriate sequence numbers S1-S5.

To identify whether a packet is lost within network portion 8-2 or generally lost within the network, network device 10 may examine information such as acknowledgement numbers on acknowledgement messages associated with acknowledgement packet flow 16 (FIG. 1).

Figure 4:
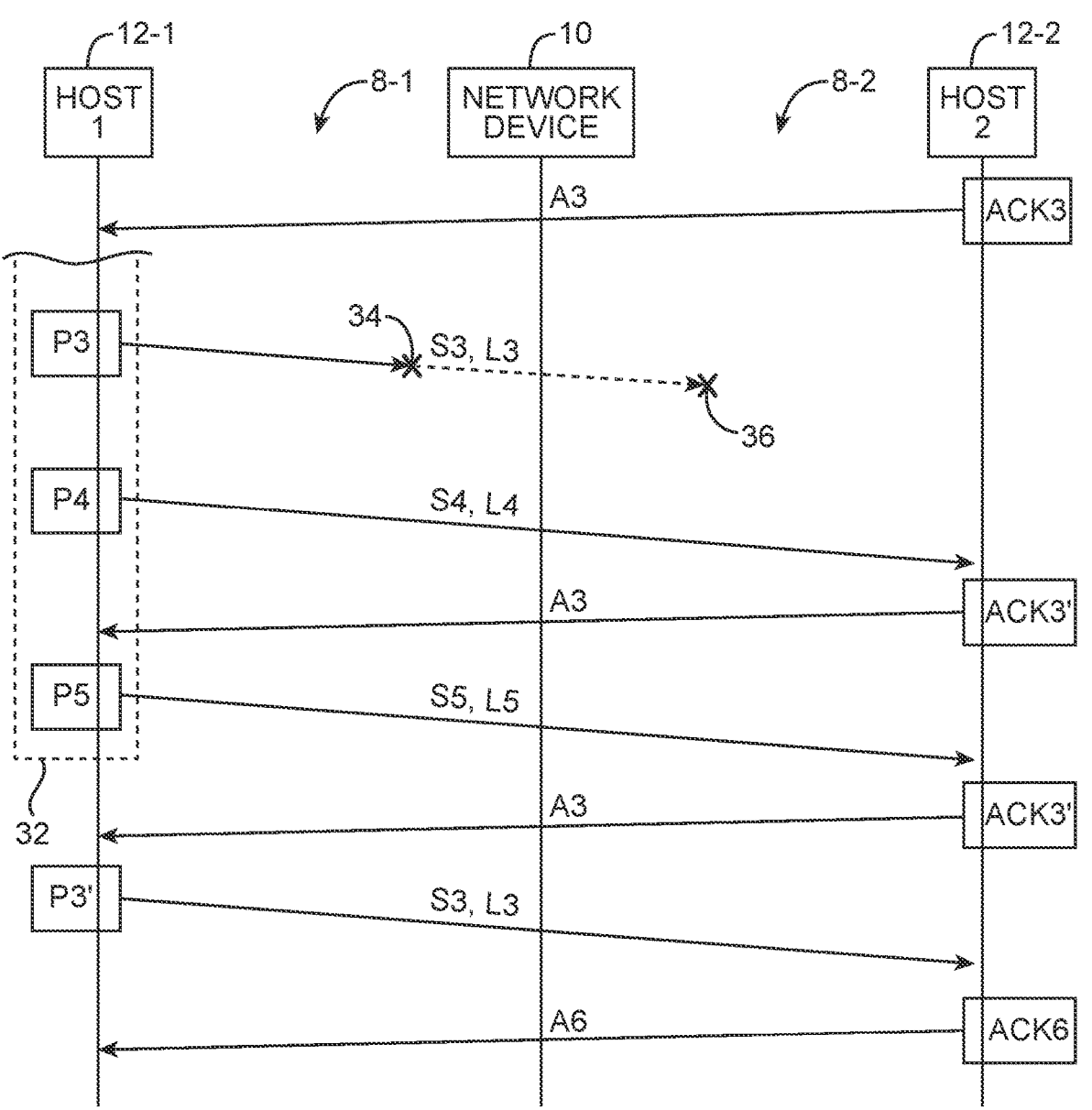
FIG. 4 is a diagram of illustrative acknowledgement messages generated based on a packet flow of the type shown in FIG. 3 in accordance with some embodiments.

FIG. 4 is a diagram showing illustrative packets that may be conveyed as part of an acknowledgement packet flow such as packet flow 16 in FIG. 1 responsive to a portion of the application data packet flow shown in FIG. 3. Based on TCP, host device 12-2 may convey acknowledgement packets ACK3, ACK3', and ACK6 to host device 12-1 responsive to received packets P1-P5. Packets ACK3, ACK3', and ACK6 may each be an instance of packet 30 in FIG. 2B and therefore include a TCP ACK number (A) (and an empty data payload).

In an ideal scenario for acknowledgement data packets conveyed in a TCP connection, the TCP ACK number of each acknowledgement packet may be based on the TCP sequence number of the next expected application data packet. In the example of FIG. 4, after host device 12-2 receives packet P2 (FIG. 3), host device 12-2 may convey an acknowledgement packet ACK3 with an acknowledgement number A3 to host device 12-1. Acknowledgement number A3 may be the sum of sequence number S2 and data payload length L2 of packet P2 and may be the same as sequence number S3 of the next expected packet P3.

However, due to packet P3 being lost somewhere within the network, the next application data packet received at host device 12-2 may be data packet P4 with sequence number S4. Accordingly, because host device 12-2 still has not received the application data packet with a sequence number S3 equal to acknowledgement number A3, device 12-2 may send another acknowledgement packet ACK3' having the same acknowledgement number A3. This acknowledgement packet ACK3' may be the first instance of a duplicate acknowledgement packet sent from host device 12-2.

Because host device 12-1 may still send additional application data packets within the same TCP window 32 such as packet P5 that are not the lost packet P3, host device 12-2 may send additional duplicate acknowledgement packets having the same acknowledgement number A3 such as a second instance of a duplicate acknowledgement packet sent from host device 12-2 after receiving packet P5.

After packet P5 within TCP window 32 has been sent, host device 12-1 may receive the second instance of the duplicate acknowledgement packet, and re-transmit packet P3' to host device 12-2. After receiving re-transmitted packet P3' having the expected sequence number S3, host device 12-2 may send the subsequent acknowledgement packet ACK6 having a new acknowledgement number A6. Acknowledgement number A6 may be the sum of sequence number S5 and data payload length L5 of packet P5 and may be the same as the sequence number of the next expected application data packet from host device 12-1.

Network device 10 may receive each of these application data packets and acknowledgments packets described in connection with FIGS. 3 and 4. Network device 10 may extract information (e.g., sequence number S, data payload length L, acknowledgement number A, etc.) from each of these data packets to identify packet losses within the network and whether each of these packet losses occurred in network portion 8-1 or network portion 8-2.

Figure 5:
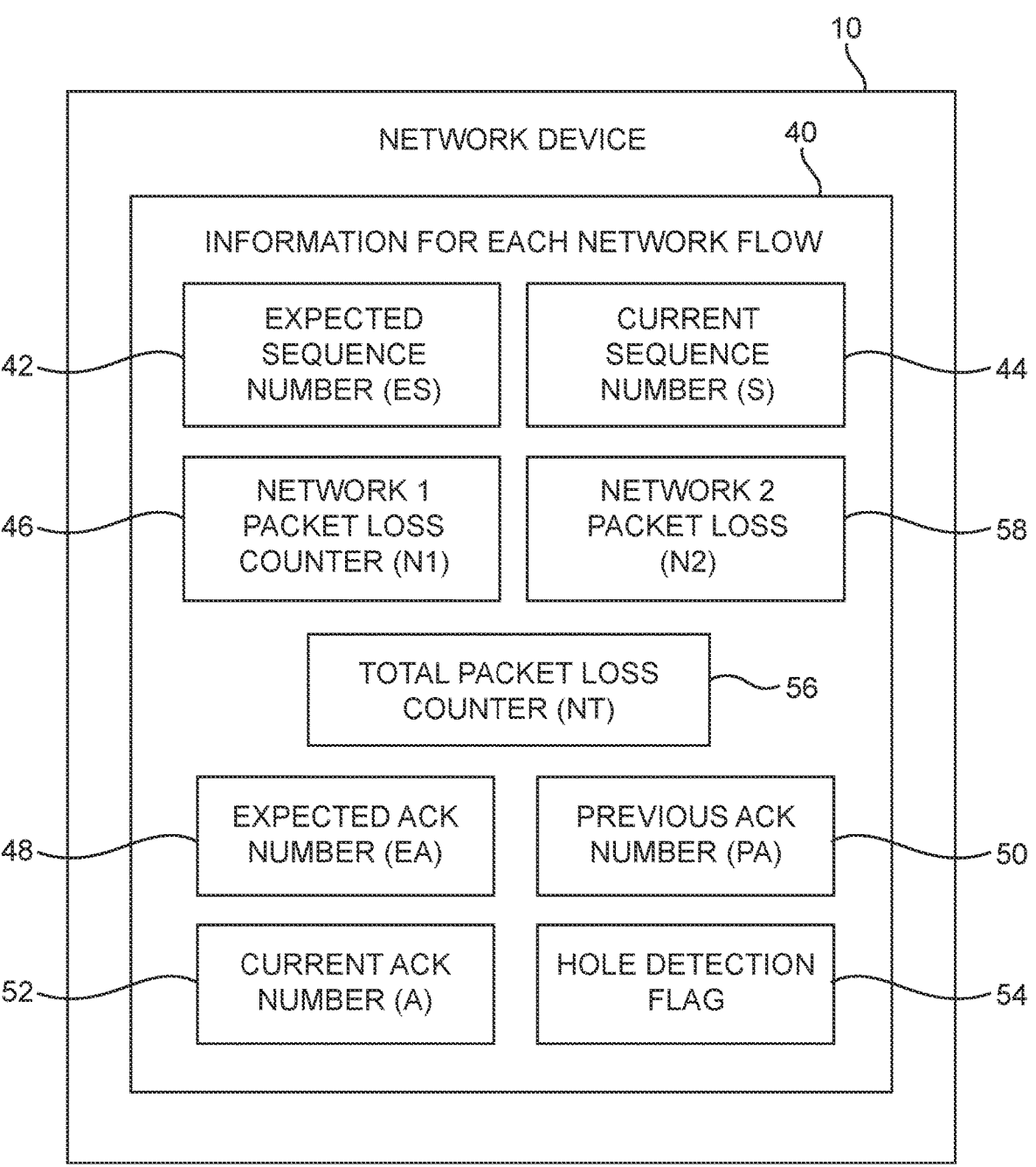
FIG. 5 is a diagram of illustrative information maintained at a network device to monitor packet loss within the network in accordance with some embodiments.

To make these determinations, network device 10 may generate, store, and/or maintain relevant information for each network flow. Each network flow may include the data packet flow and the acknowledgement packet flow responsive to the data packet flow. FIG. 5 is an illustrative diagram of network device 10 configured to maintain different types of information 40 usable to make packet loss determinations.

As shown in FIG. 5, network device 10 may maintain an expected TCP sequence number (ES) or other information 42 indicative of the expected TCP sequence number and identify a current TCP sequence number (S) or other information 44 indicative of the current TCP sequence number. The expected TCP sequence number (ES) may be continually maintained (e.g., updated) to reflect the TCP sequence number expected to be in the next application data packet if no packet loss has occurred. In other words, expected TCP sequence number (ES) may be equal to the sum of sequence number and the data payload length of the last application data packet received by network device 10. The current TCP sequence number may be the sequence number of the current application data packet received and currently being processed by network device 10. Using at least the TCP sequence number information maintained and/or received, network device 10 may further maintain a network 1 packet loss counter (N1) or other information 46 indicative of a packet loss occurring in network portion 8-1.

Figure 6:
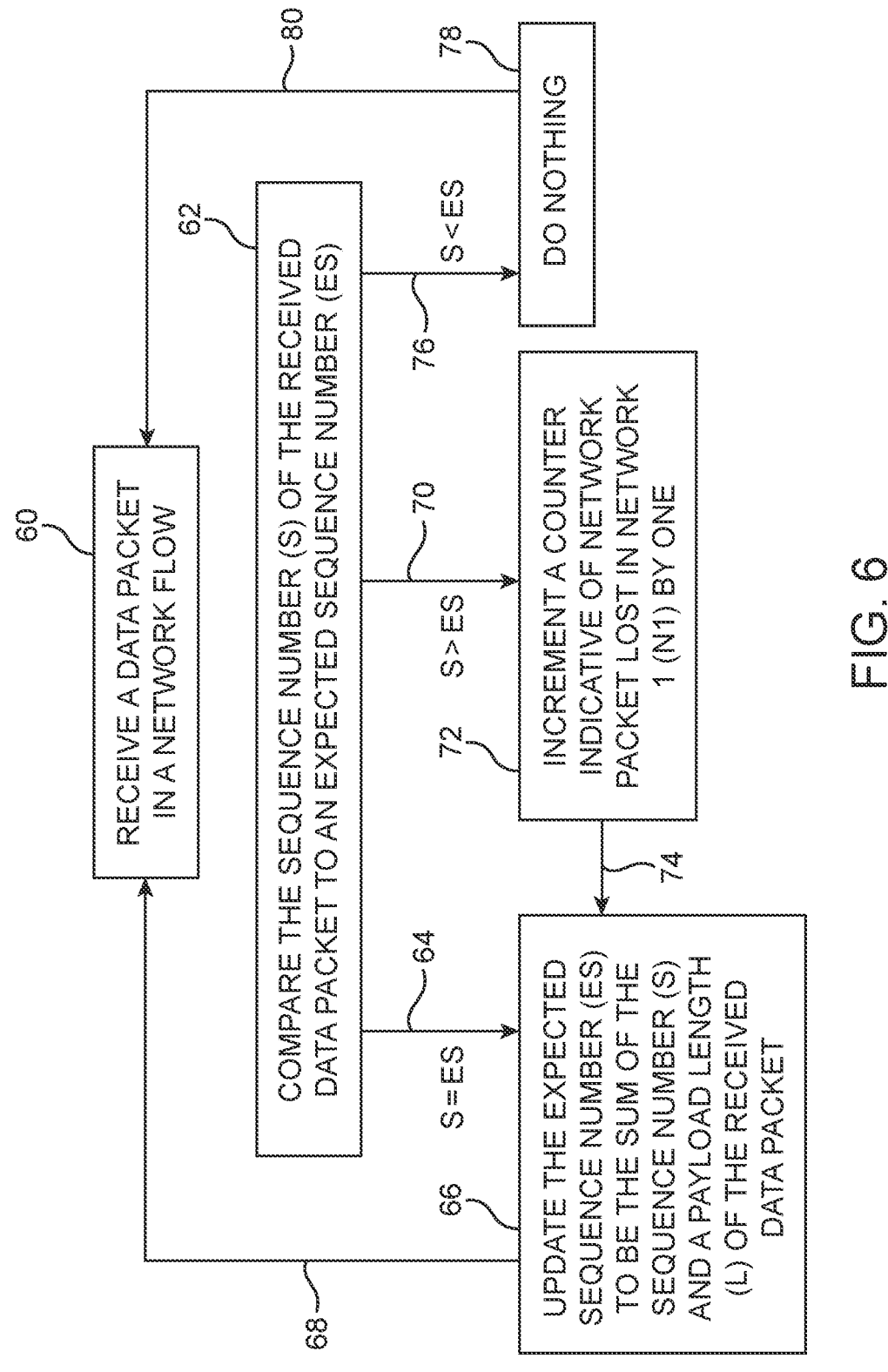
FIG. 6 is a flowchart of illustrative operations for identifying packet losses in a first network portion in accordance with some embodiments.

FIG. 6 is a flowchart of illustrative operations performed by network device 10 using TCP sequence number information and/or other information to track packet losses in a first network portion (e.g., network portion 8-1 in FIG. 1) by updating the first network packet loss counter (N1).

As shown in FIG. 6, at block 60, network device 10 may receive a data packet in a network flow (e.g., an application data packet flow having packets with application data payloads). The received data packet (e.g., data packet 20 in FIG. 2A) may include a TCP sequence number. The TCP sequence number of the currently received data packet may be the current sequence number (S).

Network device 10 may maintain an expected sequence number (ES). At block 62, network device 10 may compare the (current) sequence number (S) of the received packet to the maintained expected sequence number (ES).

In a first scenario, the current sequence number (S) may be equal to the expected sequence number (ES) and processing may proceed via path 64 to block 66. At block 66, network device 10 may update the expected sequence number (ES) to be the sum of the sequence number (S) and the data payload length (L) of the received packet. After block 66, processing may proceed via path 68 back to block 60, at which network device 10 may receive a subsequent application data packet in the same network flow (e.g., another packet in the same application data packet flow).

The processing via path 64, block 66, and path 68 may represent a processing flow which indicates that there is no packet loss within the first network portion (e.g., network portion 8-1) between the preceding packet and the currently received packet.

In the example in which the packet loss of packet P3 occurs at location 36 within network portion 8-2 (FIG. 3), each of packets P1-P5 may be processed by network device 10 via this processing flow (e.g., via path 64, block 66, and path 68). In the example in which the packet loss of packet P3 occurs at location 34 within network portion 8-1, each of packets P1, P2, and P5 may be processed by network device 10 via this processing flow (e.g., via path 64, block 66, and path 68).

In a second scenario after processing block 62, the current sequence number (S) may be greater than the expected sequence number (ES) and processing may proceed via path 70 to block 72. At block 72, the network device may increment a counter indicative of a packet loss having occurred in network 1 (e.g., network portion 8-1) by one. In other words, counter (N1) in FIG. 5 may be incremented by one at block 72.

After processing block 72, processing may similarly proceed via path 74 and proceed with block 66 and path 68 as similarly described in the first scenario. The processing path via path 70 and block 72 may represent a processing flow which indicates that there is a packet loss within the first network portion (e.g., network portion 8-1) between the preceding received packet and the currently received packet (e.g., an intervening packet between the preceding received packet and the currently received packet was lost within network portion 8-1). When processing via path 80 and block 72, the expected sequence number (ES) may still be maintained by network device 10 via block 66.

In the example in which the packet loss of packet P3 occurs at location 34 within network portion 8-1 (FIG. 3), packet P4 may be processed by network device 10 via this processing flow (e.g., via path 70, block 72, path 74, block 66, and path 68). In particular, when packet P4 is received by network device 10 (at block 60), the expected sequence number (ES) may be S3 (e.g., packet P3 should have been received after packet P2). However, because packet P3 was lost within network portion 8-1, packet P3 was not received after packet P2 and packet P4 was received instead. Accordingly, based on the comparison at block 62, the current sequence number (S) of S4 is greater than the expected sequence number (ES) of S3 and network device 10 proceeds via path 70 to block 72. At block 72, the packet loss counter for network 1 is incremented by one based on inferring the loss of packet P3 within network portion 8-1. Proceeding via path 74, at block 66, the expected sequence number (ES) of S3 is updated to S5 based on adding the sequence number S4 to the data payload L4 of packet P4.

In a third scenario after processing block 62, the current sequence number (S) may be less than the expected sequence number (ES) and processing may proceed via path 76 to block 78. At block 78, network device 10 may take no action to update the expected sequence number (ES) or to increment the counter (N1). In particular, at block 78, network device 10 may do nothing relevant to indicate or track packet loss but may perform other processing operations, if desired. After block 78, processing may proceed via path 80 back to block 60, at which network device 10 may receive a subsequent application data packet in the same network flow (e.g., another packet in the same application data packet flow).

The processing via path 76, block 78, and path 80 may represent a processing flow which indicates that the received packet may be a re-transmitted packet. In the example in which the packet loss of packet P3 occurs at location 34 within network portion 8-1 (FIG. 3), re-transmitted packet P3' may be processed by network device 10 via this processing flow (e.g., via path 76, block 78, and path 80). In particular, when re-transmitted packet P3' is received by network device 10 (at block 60), the expected sequence number (ES) may be S6 (e.g., the sum of the sequence number S5 of packet P5 and the data payload length of L5). Accordingly, based on the comparison at block 62, the current sequence number (S) of S3 of retransmitted packet P3' is less than the expected sequence number (ES) of S6 and network device 10 proceeds via path 76 to block 78. Even in the example in which the packet loss of packet P3 occurs at location 36 within network portion 8-2 (FIG. 3), re-transmitted packet P3' may be processed by network device 10 in the same way (e.g., via path 76, block 78, and path 80).

Based on the operations described in connection with FIG. 6, network device 10 may obtain information indicative of packet loss (e.g., counter N1) in a network portion (e.g., network portion 8-1) between the transmitting host device (e.g., host device 12-1 in FIG. 1) and network device 10.

Network device 10 may obtain additional information indicative of packet loss in the network such as in network portion 8-2 between network device 10 and the receiving host device (e.g., host device 12-2 in FIG. 1).

Referring back to FIG. 5, network device 10 may maintain an expected TCP ACK (acknowledgement) number (EA) or other information 48 indicative of the expected TCP ACK number, maintain a previous TCP ACK number (PA) or other information 50 indicative of the previous TCP ACK number, and identify a current TCP ACK number (A) or other information 52 indicative of the current TCP ACK number. The expected TCP ACK number (EA) may be continually maintained to reflect the TCP ACK number expected to be in the next acknowledgement message packet if no (application data) packet loss has occurred. In other words, expected TCP ACK number (EA) may be equal to the sum of sequence number and the data payload length of the last application data packet received by network device 10. The previous TCP ACK number (PA) may be the ACK number of the previously received acknowledgement message packet. The current TCP ACK number (A) may be the ACK number of the current acknowledgment message packet received and currently being processed by network device 10.

Network device 10 may also maintain a flag such as hole detection flag 54 indicative of one or more packet losses in the network. In particular, flag 54 may be set (e.g., to an asserted value of one) when one or more packet losses have been detected (e.g., based on acknowledgement number information 48, 50, and 52) and have not been resolved. Using at least the TCP ACK number information 48, 50, and 52 maintained and/or received, network device 10 may further maintain a total packet loss counter (NT) or other information 56 indicative of one or more packet losses occurring in the network (e.g., in both network portions 8-1 and 8-2).

To further determine packet loss information 58 indictive a number of packets (N2) lost in the second network (e.g., network portion 8-2), network device 10 may calculate the difference between the total packet loss counter (NT) and the first network packet loss counter (N1). If desired, this difference may be used to determine the number of packets (N2) lost in the second network or this difference may further be modified to generate a more accurate number of packets (N2) lost in the second network.

Figure 7:
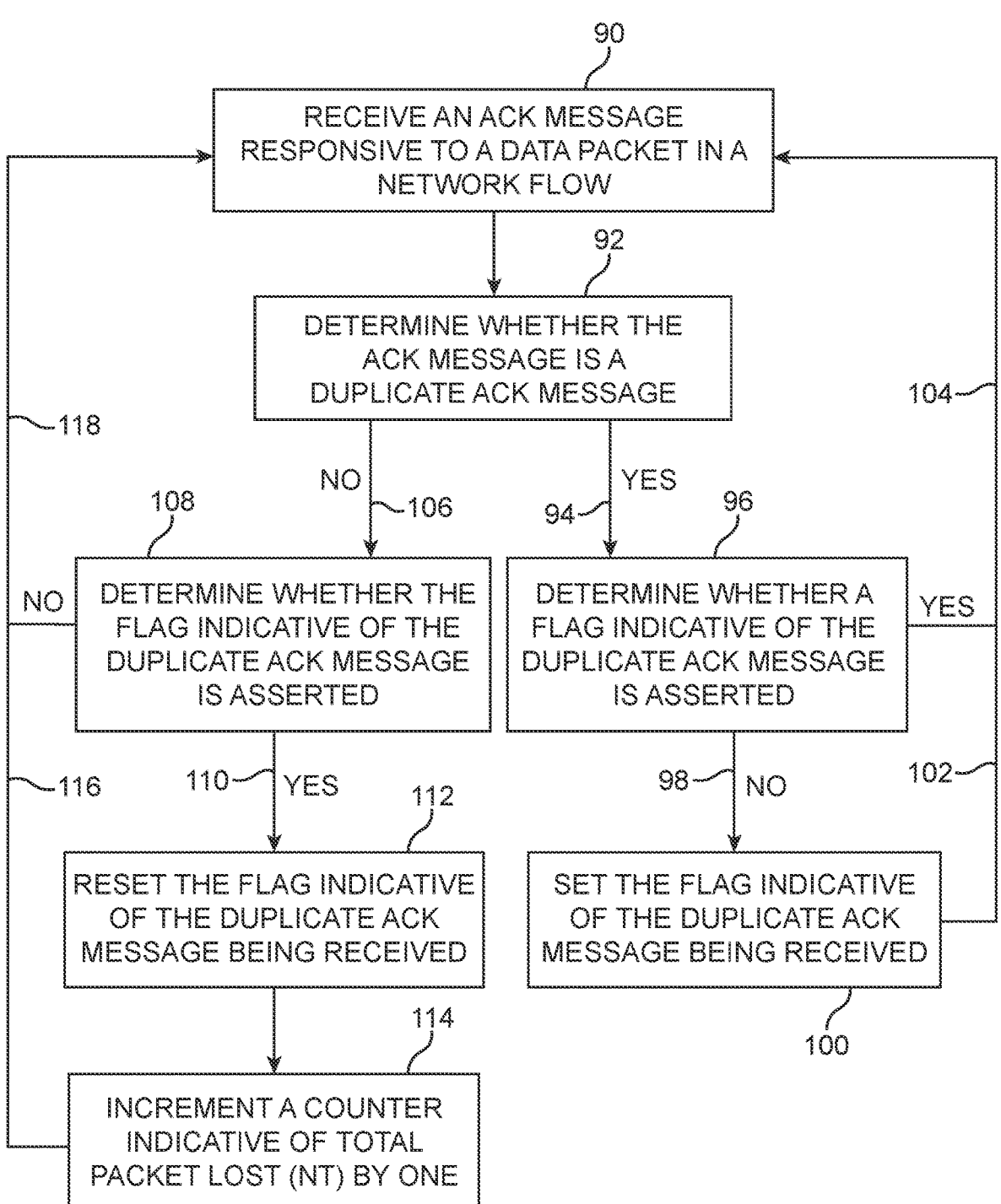
FIG. 7 is a flowchart of illustrative operations for identifying total packet losses across the network in accordance with some embodiments.

FIG. 7 is a flowchart of illustrative operations performed by network device 10 using TCP ACK number information and/or other information to track packet losses in the overall network (e.g., in both network portions 8-1 and 8-2 in FIG. 1) by updating the total packet loss counter (NT).

As shown in FIG. 7, at block 90, network device 10 may receive an acknowledgement message packet that acknowledges packets in the corresponding network flow as described in connection with FIG. 6 (e.g., an acknowledgement packet flow having acknowledgement packets with empty payloads). The received acknowledgment message (e.g., data packet 30 in FIG. 2B) may include a TCP ACK number. The TCP ACK number of the currently received acknowledge message may be the current ACK number (A).

At block 92, network device 10 may determine whether the acknowledgement message (packet) is a duplicate acknowledgement message. In some illustrative configurations described herein as an example, network device 10 may identify whether or not the received acknowledgement message is a duplicate message by comparing the ACK number of the received acknowledgement message (e.g., the current ACK number (A)) to an expected ACK number (EA) maintained at network device 10. In response to the current ACK number not being the expected ACK number and/or other comparisons and determinations, the network device may determine that the received acknowledgement message is a duplicate message.

If the received acknowledgement message is a duplicate acknowledgement message, processing may proceed via path 94 to block 96. At block 96, network device 10 may further determine if a flag indicating a "hole" in the TCP application data packet flow (e.g., flag 54 in FIG. 5) is already set or asserted. The "hole" refers to one or more (unrecovered) packet losses that has occurred in the network but has not been mitigated (or recovered) via re-transmission of the one or more corresponding packets.

In a first scenario after processing block 96, the received duplicate acknowledgement message may be the first duplicate acknowledgement message (e.g., may be a first duplicate acknowledgement message ACK3' sent by host device 12-2 after reception of packet P4 in the example of FIG. 4). In this scenario, flag 54 may not have been set or asserted (e.g., have an un-set value of zero), but may be set or asserted at block 100. In other words, processing may proceed via path 98 to block 100. At block 100, network device 10 may set flag 54 (e.g., to a set value of one) to indicate that a packet loss has occurred in the network and has not been mitigated via re-transmission of the packet. After block 100, processing may proceed via path 102 back to block 90, at which network device 10 may receive a subsequent acknowledgement message (packet) in the same acknowledgement message flow (e.g., another acknowledgement message in response to the same application data packet flow).

In a second scenario after processing block 96, the received duplicate acknowledgement message may not be the first duplicate message (e.g., may be a second duplicate acknowledgement message ACK3' sent by host device 12-2 after reception of packet P5 in the example of FIG. 4). In this scenario, flag 54 may already be asserted (e.g., when the first duplicate acknowledgement message ACK3' was received and processed by network device 10). In this scenario, processing may proceed via path 104 back to block 90, at which network device 10 may receive a subsequent acknowledgement message (packet) in the same acknowledgement message flow.

If the received acknowledgement message is not a duplicate acknowledgement message (e.g., as determined at block 92), processing may proceed via path 106 to block 108. At block 108, network device 10 may further determine if the flag indicative of a hole in the TCP application flow (e.g., flag 54 in FIG. 5) is already set or asserted.

In a first scenario after processing block 108, the received non-duplicate acknowledgement message may be an acknowledgement message acknowledging reception of a re-transmitted packet (e.g., may be acknowledgement message ACK6 sent by host device 12-2 after reception of re-transmitted packet P3' in the example of FIG. 4). In this scenario, flag 54 may already be in a set or asserted state (e.g., have a set value of one). Accordingly, after block 108, processing may proceed via path 110 to block 112. At block 112, network device 10 may reset flag 54 (e.g., to an un-set value of zero) to indicate that the packet loss has been mitigated via the acknowledged receipt of a re-transmitted packet (e.g., a recovery of the packet loss). After block 100, processing may proceed to block 114. At block 114, network device 114 may increment a counter indicative of total packet losses in the network (e.g., across both portions 8-1 and 8-2) (NT) by one. In other words, the counter (NT) is incremented when a hole in the TCP application data flow is filled. After block 114, processing may proceed via path 116 back to block 90, at which network device 10 may receive a subsequent acknowledgement message (packet) in the same acknowledgement message flow.

In a second scenario after processing block 108, the received duplicate acknowledgement message may be a normal acknowledgement packet acknowledging reception of application data packets without any packet losses therebetween (e.g., may be acknowledgement message ACK3 sent by host device 12-2 after reception of packet P2 (shown in FIG. 3) in the example of FIG. 4). In this scenario, flag 54 may be un-asserted or un-set because no hole or unresolved duplicate acknowledgement messages were received by network device 10. In this scenario, processing may proceed via path 118 back to block 90, at which network device 10 may receive a subsequent acknowledgement message (packet) in the same acknowledgement message flow.

While some operations described in connection with FIGS. 6 and 7 (and other operations described herein) reference FIGS. 3 and 4, which illustrative packets with respect to a fixed TCP window 32 (e.g., fixed at a given instance in time), these operations may continue even as TCP window 32 is dynamically adjusted (e.g., as window size is changed, as the window slides when previously sent packets are acknowledged, as receive/send buffer changes, etc.). Similarly, information 40 in FIG. 5 and the values therein (e.g., counter values, flag values, different SEQ/ACK numbers, etc.) may also persist and be maintained (e.g., appropriately updated based on received packets) even as TCP window 32 is dynamically adjusted.

FIGS. 6 and 7 are merely illustrative of some operations or behavior of network device 10. If desired, other operations instead of and/or in addition to those described in connection with FIGS. 6 and 7 may be performed to track packet losses across the entire network, at network portion 8-1, and/or at network portion 8-2. A few additional illustrative scenarios and examples are described below for network device 10 to handle other patterns of application packet flows and/or acknowledgement message flows.

As a first example, in the scenario of application data packet reordering, the flowchart in FIG. 6 may increment the counter (N1) indicative of packet loss in the first network at block 72, even when no packet loss has occurred. To reconcile this false positive condition, network device 10 may additionally determine if the following criteria are met when processing each acknowledgement message packet: 1) the stored value of flag 54 (e.g., maintained and/or updated based on the operations in FIG. 7) is an un-set value (e.g., zero), 2) the expected ACK number is equal to the current ACK number of the currently received acknowledgement packet, and 3) the counter (N1) indicative of packet loss in the first network portion is at a non-zero value to identify this false positive condition. In response to each of these three criteria being true for a given received acknowledgement packet, the counter (N1) indicative of packet loss in the first network portion can be reset to zero.

In general, the determination of these three conditions may be performed as part of or as an extension of one or more blocks of FIG. 7 or by introducing new paths and/or blocks to FIG. 7. In one arrangement, network device 10 may compare the expected ACK number to the current ACK number at block 92 as part of identifying a duplicate acknowledgement message, may determine whether flag 54 is asserted or set at block 108, and may further determine whether or not the counter (N1) indicative of packet loss in the first network portion is at a non-zero value (e.g., at block 92, at block 108, at an additional block interposed along path 118, etc.) to enable network device 10 to reset the counter (N1) indicative of packet loss in the first network portion to zero if this application data packet reordering or false positive condition has been met.

As a second example, in the scenario of multiple distinct data packet losses in the same TCP window, the normal acknowledgement packet checking flowchart can mistake the multiple losses for a single loss. If this multiple packet loss condition is met, the counter indicative of the general network packet loss may be incremented by one. In this example, as an extension of the processing of each acknowledgement message packet as described in connection with FIG. 7, network device 10 may also determine: 1) whether flag 54 is set, 2) the current acknowledgement number is not the previous acknowledgement number, and 3) the current acknowledgement number is not the expected ACK number. Based on all three of these conditions being true, network device 10 may determine that multiple packet losses had occurred in the network and one of such re-transmitted packets has been acknowledged. Network device 10 may then increase the counter (NT) indicative of total packets lost in the network while not resetting flag 54 (e.g., this is done as a separate manner of incrementing counter (NT) than the manner described in connection with block 114 in FIG. 7).

In general, the determination of these three conditions may be performed as part of or as an extension of one or more blocks of FIG. 7 or by introducing new paths and/or blocks to FIG. 7. In one arrangement, network device 10 may compare the expected ACK number to the current ACK number at block 92 as part of identifying a duplicate acknowledgement message, may determine whether flag 54 is asserted or set at block 96, and may further compare the expected ACK number to the current ACK number (e.g., at block 92, at block 108, at an additional block along interposed along path 118, etc.) to enable network device 10 to reset the counter (N1) indicative of packet loss in the first network portion to zero if this application data packet reordering or false positive condition has been met.

Figure 8:
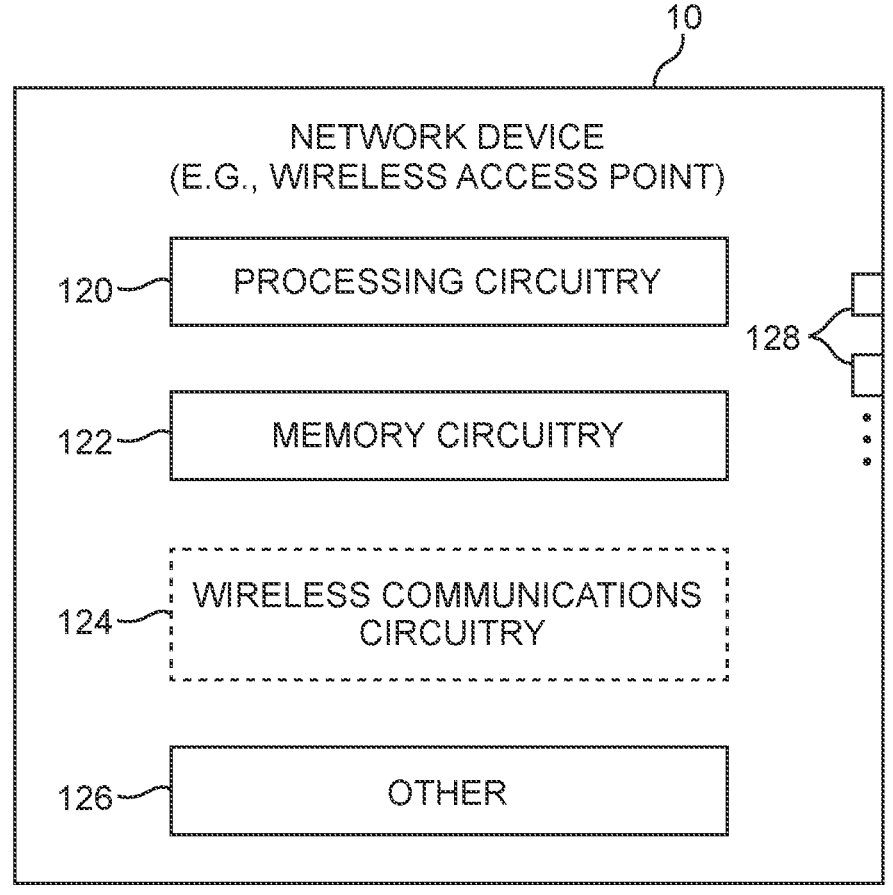
FIG. 8 is a diagram of an illustrative network device configured to monitor packet losses within the network in accordance with some embodiments.

FIG. 8 is a diagram of an illustrative hardware configuration for a network device 10 such as a wireless access point. As shown in FIG. 8, network device 10 (e.g., used to implement network device 10 as shown in FIGS. 1 and 3-5 and network device 10 as described in connection with FIGS. 1-7 and 9) may include processing circuitry 120, memory circuitry 122, optionally wireless communications circuitry 124 (e.g., in configurations in which network device 10 is a wireless access point or other types of wireless communication device), and other components 126 such as input-output interfaces or ports 128.

In particular, processing circuitry 120 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 122 may include volatile memory such as dynamic random-access memory, static random-access memory, etc., and non-volatile memory such as hard-drive storage, solid-state storage, flash memory, etc.

In general, the operations described herein relating to the operation of the network device 10 and/or other relevant operations may be stored as (software) instructions on one or more non-transitory computer-readable storage media (e.g., memory circuitry 122) in network device 10. The corresponding processing circuitry (e.g., processing circuitry 120) in network device 10 for these one or more non-transitory computer-readable storage media may process the respective instructions to perform the corresponding network device operations. Processing circuitry 120 and memory circuitry 122, collectively, may sometimes be referred to herein as the control circuitry of network device 10 because the two are often collectively used to control one or more components of network device 10 to perform these operations (e.g., by sending and/or receiving requests, control signals, data, etc.).

In illustrative configurations in which network device 10 is a wireless access point and/or includes wireless communications functionalities, network device 10 may include wireless communication circuitry 124 to wirelessly communicate with host devices (e.g., host devices 12-1 and/or 12-2 in FIG. 1). Wireless communication circuitry 124 may include one or more radios (e.g., Wi-Fi radios), radio-frequency transceiver circuitry, radio-frequency front-end circuitry, and one or more antennas. The one or more radios may use the one or more antennas to transmit radio-frequency signals to and receive radio-frequency signals from one or more host devices 12 (FIG. 1). As an example, network device 10 may convey these radio-frequency signals at one or more Wi-Fi frequency bands, and more specifically at one or more radio-frequency channels in these frequency bands. While wireless communication circuitry 124 is shown as a separate element from processing circuitry 120, this is merely illustrative. If desired, portions of wireless communication circuitry 124 (e.g., radio functionalities) may be implemented on portions of processing circuitry 120.

Network device 10 may include other components 126 such as one or more input-output interfaces or ports 128 such as Ethernet ports or other types of network interface ports that provided connections to other network elements (e.g., switches, routers, modems, controllers) in the network, power ports through which power is supplied to network device 10, or other ports. In general, input-output components in network device 10 may include communication interface components that provide a Bluetooth® interface, a Wi-Fi® interface, an Ethernet interface (e.g., one or more Ethernet ports), an optical interface, and/or other networking interfaces for connecting network device 10 to the Internet, a local area network, a wide area network, a mobile network, other types of networks, and/or to another network device, peripheral devices, and/or other electronic components If desired, other components 126 on network device 10 may include other input-output devices such as devices that provide output to a user such as a display device (e.g., one or more status lights) and/or devices that gather input from a user such as one or more buttons. If desired, other components 126 on network device 10 may include one or more sensors such as radio-frequency sensors. If desired, network device 10 may include other components 126 such as a system bus that couples the components of network device 10 to one another, to power management components, etc. In general, each component within network device 10 may be interconnected to the control circuitry (e.g., processing circuitry 120 and/or memory circuitry 122) in network device 10 via one or more paths that enable the reception and transmission of control signals and/or other data.

Figure 9:
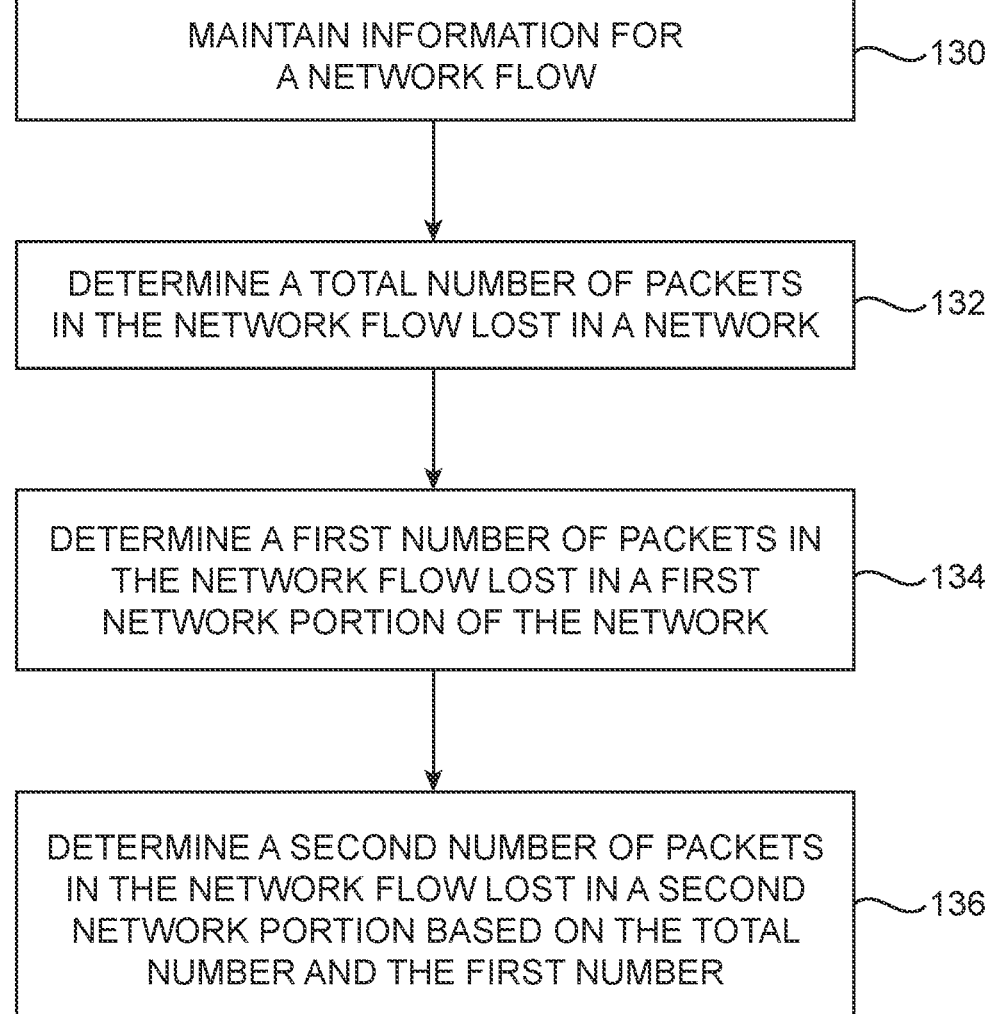
FIG. 9 is a flowchart of illustrative operations for determining the distribution of packet losses across first and second network portions of the network in accordance with some embodiments.

FIG. 9 is a flowchart of illustrative packet loss tracking operations performed using one or more network devices in a network such as network device 10 in network 8 as shown in FIGS. 1, 3, and 4. The illustrative operations described in connection with FIG. 9 may generally be performed using control circuitry in network device 10 (e.g., memory circuitry 122 in network device 10 and/or processing circuitry 120 in network device 10 by executing software instructions stored on memory circuitry 122 in network device 10). If desired, one or more operations described in connection with FIG. 9 may be performed by other dedicated hardware components in network device 10 (e.g., other components 126 in network device 10 of FIG. 8).

As shown in FIG. 9, at block 130, memory circuitry 122 in network device 10 may store information for a network flow and processing circuitry 120 in network device 10 may maintain the stored information (e.g., periodically update the stored information based on the operations described in connection with FIGS. 6 and 7). As an example, the information maintained may be information 40 as described in connection with FIG. 5. In particular, the information for each network flow may include information 42 and 44, and counter 46 relevant to an application data network flow and may include information 48, 50, and 52, flag 54, and counter 56 relevant to an acknowledgement message network flow of acknowledge packets in the application data network flow. Multiple sets of information for multiple network flows (e.g., a pair of network flows between a pair of host devices, multiple network flows between multiple pairs of host devices, etc.) may be maintained at network device 10.

As an example, between a pair of host devices such as host devices 12-1 and 12-2, two instances of network flows may exist: 1) a first application data packet flow from host device 12-1 to host device 12-2 (e.g., identifiable with packet header information containing a source IP address and a source L4 port associated with host device 12-1 and a destination IP address and a destination L4 port associated with host device 12-2) and a corresponding acknowledge message packet flow from host device 12-2 to host device 12-1 acknowledging packets in the first application data packet flow, and 2) a second application data packet flow from host device 12-2 to host device 12-1 (e.g., identifiable with packet header information containing a source IP address and a source L4 port associated with host device 12-2 and a destination IP address and a destination L4 port associated with host device 12-1) and a corresponding acknowledge message packet flow from host device 12-1 to host device 12-2 acknowledging packets in the second application data packet flow. In this example, two sets of information 40 (FIG. 5) may be maintained at network device 10 (e.g., stored at memory circuitry 122).

At block 132, processing circuitry 120 may determine a total number of packets in the network flow lost in a network. This determination may occur by periodically examining and/or outputting (e.g., for long-term storage) the value of the counter (NT) indicative of a total packet loss in the network.

At block 134, processing circuitry 120 may determine a first number of packets in the network flow lost in a first network portion of the network. This determination may occur by periodically examining and/or outputting (e.g., for long-term storage) the value of counter (N1) indicative of a packet loss in the first network portion.

At block 136, processing circuitry 120 may determine a second number of packets in the network flow lost in a second network portion based on the total number of lost packets in the network and the first number of packets lost in the first network portion. In particular, network device 10 may subtract the value of counter (N1) from the value of counter (NT) to determine a number of packets (N2) lost in the second network portion.

If desired, each of these values N1, N2, and NT for a given network flow may further be processed and/or stored as packet loss statistics associated with the given network flow. In such a manner, a comparison between values N1 and N2 may indicate which network portion (e.g., network portion 8-1 or network portion 8-2) contributes to more packet losses or generally the distribution of packet losses within the network. If desired, the packet loss statistics may be output from network device 10 and provided to a controller and/or management system that displays the packet loss statistics to a user or generally uses the packet loss statistics, e.g., for performing mitigation operations. If desired, appropriate mitigation operations may be taken by network device 10 or other network devices based on which network portion contributes to more packet losses.

The methods and operations described above in connection with FIGS. 1-9 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processing circuitry 120 in network device 10 of FIG. 8).

The foregoing is merely illustrative and various modifications can be made to the described embodiments. The foregoing embodiments may be implemented individually or in any combination.

What is claimed is:

1. A method of packet loss location identification, the method comprising:

receiving, by a network device, a data packet having a sequence number;

maintaining a first counter indicative of packet loss in a first network portion between the network device and a first host that sent the data packet;

updating the first counter based at least in part on the sequence number;

receiving, by the network device, an acknowledgement packet having an acknowledgement number;

maintaining a second counter indicative of packet loss in a network containing the first network portion;

updating the second counter based at least in part on the acknowledgement packet; and identifying packet loss in a second network portion in the network and between the network device and a second host that sent the acknowledgement packet based on the first counter and the second counter.

2. The method defined in claim 1 further comprising:

maintaining an expected sequence number; and comparing the sequence number to the expected sequence number, wherein the first counter is updated based at least in part on the comparison of the sequence number to the expected sequence number.

3. The method defined in claim 2, wherein updating the first counter based at least in part on the comparison of the sequence number to the expected sequence number comprises incrementing the first counter in response to determining that the sequence number is greater than the expected sequence number.

4. The method defined in claim 3, wherein maintaining the expected sequence number comprises updating the expected sequence number to be a sum of the sequence number and a data payload length of the data packet.

5. The method defined in claim 2 further comprising:

in response to determining that the sequence number is equal to the expected sequence number, maintaining the expected sequence number by updating the expected sequence number to be a sum of the sequence number and a data payload length of the data packet.

6. The method defined in claim 2 further comprising:

in response to determining that the sequence number is less than the expected sequence number, not incrementing the first counter and not updating the expected sequence number.

7. The method defined in claim 2 further comprising:

determining whether the acknowledgement packet is a duplicate acknowledgement packet.

8. The method defined in claim 7 further comprising:

maintaining an expected acknowledgement number, wherein determining whether the acknowledgement packet is the duplicate acknowledgement packet comprises comparing the acknowledgement number to the expected acknowledgement number.

9. The method defined in claim 8 further comprising:

maintaining a flag indicative of an unrecovered packet loss based at least in part on the comparison of the acknowledgement number to the expected acknowledgement number.

10. The method defined in claim 9, wherein updating the second counter comprises incrementing the second counter based on a recovery of the unrecovered packet loss.

11. The method defined in claim 10 further comprising:

identifying the recovery of the unrecovered packet loss at least in part by receiving a non-duplicative acknowledgement message when the flag is in a set state.

12. The method defined in claim 1, wherein identifying the packet loss in the second network portion comprises calculating a difference between the first counter and the second counter.

13. The method defined in claim 1 wherein the data packet belongs to an application data packet flow and the acknowledgement packet belongs to an acknowledgement message packet flow that acknowledges receipt of data packets in the application data packet flow.

14. The method defined in claim 13, wherein the sequence number comprises a Transmission Control Protocol (TCP) sequence number in a header of the data packet and wherein the acknowledgement number comprises a TCP acknowledgement number in a header of the acknowledgement packet.

15. A method of packet loss identification, the method comprising:

storing, by a network device, first information indicative of a first number of packets lost in a first portion of a network;

updating the first information indicative of the first number of packets lost in the first portion of the network based on sequence numbers of data packets received from the first portion of the network;

storing, by the network device, second information indicative of a second number of packets lost in the network;

updating the second information indicative of the second number of packets lost in the network based on acknowledgement numbers of acknowledgement packets received from a second portion of the network, wherein the acknowledgement packets acknowledge receipt of at least some of the data packets; and calculating a third number of packets lost in the second portion of the network based on the updated first information indicative of the first number of packets lost in the first portion of the network and the updated second information indicative of the second number of packets lost in the network.

16. The method defined in claim 15, wherein the first, second, and third numbers of packets lost are indicative of packet losses in a same network flow.

17. The method defined in claim 15, wherein the network device comprises a wireless access point, wherein the first portion of the network comprises a wireless portion of the network, and wherein the second portion of the network comprises a wired portion of the network.

18. One or more non-transitory computer-readable storage media comprising computer-executable instructions that, when executed by one or more processors for a network device, cause the one or more processors to:

compare a current sequence number of a first packet to an expected sequence number, the first packet belonging to an application data packet flow;

store information indicative of application data packet loss in a first network portion through which the application data packet flow is received;

compare a current acknowledgement number of a second packet to an expected acknowledgement number, the second packet belonging to an acknowledgement message packet flow containing acknowledgement messages acknowledging receipt of packets in the application data packet flow;

store additional information indicative of application data packet loss in a network containing the first network portion; and determine application data packet loss in a second network portion of the network based on the information indicative of application data packet loss in the first network portion and the additional information indicative of application data packet loss in the network.

19. The one or more non-transitory computer-readable storage media defined in claim 18 further comprising computer-executable instructions that, when executed by the one or more processors for the network device, cause the one or more processors to:

update the information indicative of application data packet loss in the first network portion in response to the current sequence number of the first packet being less than the expected sequence number.

20. The one or more non-transitory computer-readable storage media defined in claim 18 further comprising computer-executable instructions that, when executed by the one or more processors for the network device, cause the one or more processors to:

update the expected sequence number to be a sum of the current sequence number of the first packet and a data payload length of the first packet.

\* \* \* \* \*